United States Patent
Dong et al.

(10) Patent No.: US 9,436,606 B2
(45) Date of Patent: Sep. 6, 2016

(54) SYSTEM AND METHOD TO DEFRAGMENT A MEMORY

(71) Applicant: QUALCOMM Incorporated, San Diego, CA (US)

(72) Inventors: Xiangyu Dong, San Diego, CA (US); Jungwon Suh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 220 days.

(21) Appl. No.: 14/146,576

(22) Filed: Jan. 2, 2014

(65) Prior Publication Data

US 2015/0186279 A1 Jul. 2, 2015

(51) Int. Cl.
*G06F 12/08* (2016.01)
*G06F 12/10* (2016.01)
*G06F 3/06* (2006.01)

(52) U.S. Cl.
CPC ......... *G06F 12/0833* (2013.01); *G06F 3/0608* (2013.01); *G06F 12/0873* (2013.01); *G06F 12/0895* (2013.01); *G06F 2206/1004* (2013.01); *G06F 2212/62* (2013.01); *G06F 2212/69* (2013.01); *Y02B 60/1225* (2013.01)

(58) Field of Classification Search
CPC .. G06F 12/08; G06F 11/1448; G06F 3/0608; G06F 3/061; G06F 3/0644; G06F 12/0862; G06F 12/0873; G06F 3/064; G06F 3/0659; G06F 3/0679; G06F 2212/702; G06F 12/0833; G06F 12/0895; G06F 2206/1004; G06F 2212/62; G06F 2212/69; Y02B 60/1225
See application file for complete search history.

(56) References Cited

U.S. PATENT DOCUMENTS

| | | | | |
|---|---|---|---|---|
| 5,317,704 A * | 5/1994 | Izawa | ................. | G06F 12/1063 711/207 |
| 6,073,076 A | 6/2000 | Crowley et al. | | |
| 7,350,017 B2 * | 3/2008 | Okuyama | ............. | G06F 3/0605 711/112 |
| 7,447,869 B2 | 11/2008 | Kruger et al. | | |
| 7,562,203 B2 | 7/2009 | Scott et al. | | |
| 7,644,239 B2 | 1/2010 | Ergan et al. | | |
| 7,788,460 B2 * | 8/2010 | Rothman | ............. | G06F 3/0613 711/101 |
| 7,822,941 B2 | 10/2010 | Vick et al. | | |
| 8,069,299 B2 | 11/2011 | Chartrand | | |
| 2005/0108496 A1 * | 5/2005 | Elnozahy | ............ | G06F 12/1045 711/203 |
| 2008/0301256 A1 * | 12/2008 | McWilliams | ....... | G06F 12/0284 709/214 |
| 2008/0301354 A1 * | 12/2008 | Bekooij | ............. | G06F 12/0284 711/100 |

(Continued)

OTHER PUBLICATIONS

International Search Report and Written Opinion for International Application No. PCT/US2014/069780, ISA/EPO, date of Mailing Apr. 8, 2015, 9 pages.
Chan, K., et al., "Design of the HP PA 7200 CPU", Hewlett-Packard Journal, Feb. 1996, Hewlett-Packard, Palo Alto, CA, 11 pages.

*Primary Examiner* — Hashem Farrokh
(74) *Attorney, Agent, or Firm* — Toler Law Group, PC

(57) ABSTRACT

A system and method to defragment a memory is disclosed. In a particular embodiment, a method includes loading data stored at a first physical memory address of a memory from the memory into a cache line of a data cache. The first physical memory address is mapped to a first virtual memory address. The method further includes initiating modification, at the data cache, of lookup information associated with the first virtual memory address so that the first virtual memory address corresponds to a second physical memory address of the memory. The method also includes modifying, at the data cache, information associated with the cache line to indicate that the cache line corresponds to the second physical memory address instead of the first physical memory address.

30 Claims, 12 Drawing Sheets

(56) References Cited

U.S. PATENT DOCUMENTS

2010/0185806 A1* 7/2010 Pruthi ............... G06F 12/0246
                                                   711/103
2011/0066808 A1  3/2011 Flynn et al.
2012/0117301 A1  5/2012 Wingard
2013/0086006 A1* 4/2013 Colgrove ............ G06F 3/0688
                                                   707/692

* cited by examiner

SYSTEM AND METHOD TO DEFRAGMENT A MEMORY

I. FIELD

The present disclosure is generally related to defragmenting a memory.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Computing devices may include a processor, such as a central processing unit (CPU). Modern CPUs may use virtual memory space. The CPU may include a memory management unit (MMU) to manage virtual-to-physical memory address translation. MMUs may use algorithms to allocate physical memory. Over time, allocation algorithms may lead to memory fragments. The presence of memory fragments may make it difficult to apply certain power saving features in a computing device. For example, dynamic random access memory (DRAM) may employ power saving features such as partial array self-refresh (PASR). During PASR, a portion of the DRAM may be powered down. Memory fragmentation may render PASR ineffective because fewer portions of the DRAM are empty and available to be powered down without risk of losing data.

One way to enable PASR when fragmentation occurs is to defragment data stored at the DRAM. Defragmenting the DRAM may enable advanced power saving features, such as PASR to save additional power. However, the memory defragmentation process typically involves the processor performing a large amount of data movement within the memory. The data movement may cause reduced processor performance while the memory is being defragmented. Further, the power required by the processor to perform the data movement may exceed the power saved by using PASR.

III. SUMMARY

Systems and methods to defragment a memory perform data movement associated with defragmentation during cache management. For example, an operating system may detect a data fragment. The operating system may determine that the data fragment, e.g., data stored in a region A, should be relocated to a "hole," e.g., a location in region B. In response to detecting the data fragment, the operating system may issue a load and remap instruction to the processor. During execution of the load and remap instruction, a defragmentation process may be performed at a cache. The cache may load the data from region A into the cache. The cache may include tag information used to map the data within the cache to a physical address of the data in the memory. The cache may change the tag information such that the data associated with the region A is remapped to the physical address of the location in region B. When the remapped cache lines are subsequently evicted from the cache (e.g., in accordance with a cache management policy, such as least recently used (LRU), least frequently used (LFU), or first-in-first-out (FIFO) policy), the remapped cache lines are stored at the physical address of the location in region B instead of region A, thereby defragmenting the memory during cache management.

In a particular embodiment, a method includes loading data stored at a first physical memory address of a memory into a cache line of a data cache. The first physical memory address is mapped to a first virtual memory address. The method further includes initiating modification, at the data cache, of lookup information associated with the first virtual memory address so that the first virtual memory address corresponds to a second physical memory address of the memory. The method also includes modifying, at the data cache, information associated with the cache line to indicate that the cache line corresponds to the second physical memory address instead of the first physical memory address.

In another particular embodiment, a system includes a memory including a plurality of physical memory addresses. The system further includes a data cache that includes a defragmentation circuit configured to perform memory defragmentation operations. The defragmentation operations include loading data stored at a first physical memory address of the memory from the memory into a cache line of the data cache. The first physical memory address is mapped to a first virtual memory address. The defragmentation operations also include initiating modification of lookup information associated with the first virtual memory address so that the first virtual memory address corresponds to a second physical memory address of the memory. The defragmentation operations include modifying information associated with the cache line to indicate that the cache line corresponds to the second physical memory address instead of the first physical memory address.

In another particular embodiment, a computer-readable medium includes instructions that, when executed by a processor, cause the processor to perform operations. The operations include loading data stored at a first physical memory address of a memory into a cache line of a data cache. The first physical memory address is mapped to a first virtual memory address. The operations further include initiating modification of lookup information associated with the first virtual memory address so that the first virtual memory address corresponds to a second physical memory address of the memory. The operations also include modifying information associated with the cache line to indicate that the cache line corresponds to the second physical memory address instead of the first physical memory address.

In another particular embodiment, a system includes means for storing data using a plurality of physical memory addresses, and the system further includes means for caching data. The means for caching data includes a defragmentation circuit configured to load data stored at a first physical memory address of a memory from the memory into a cache line of a data cache. The first physical memory address is mapped to a first virtual memory address. The defragmentation circuit is further configured to initiate modification of lookup information associated with the first virtual memory address so that the first virtual memory address corresponds to a second physical memory address of the memory. The defragmentation circuit is also configured to modify information associated with the cache line to indicate that the cache line corresponds to the second physical memory address instead of the first physical memory address.

One particular advantage provided by at least one of the disclosed embodiments is the ability to integrate data movement associated with memory defragmentation into cache management instead of performing data movement operations exclusively for memory defragmentation. Integrating data movement associated with memory defragmentation into cache management may enable the processor to perform other operations or to enter a power-save mode while the cache performs defragmentation.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
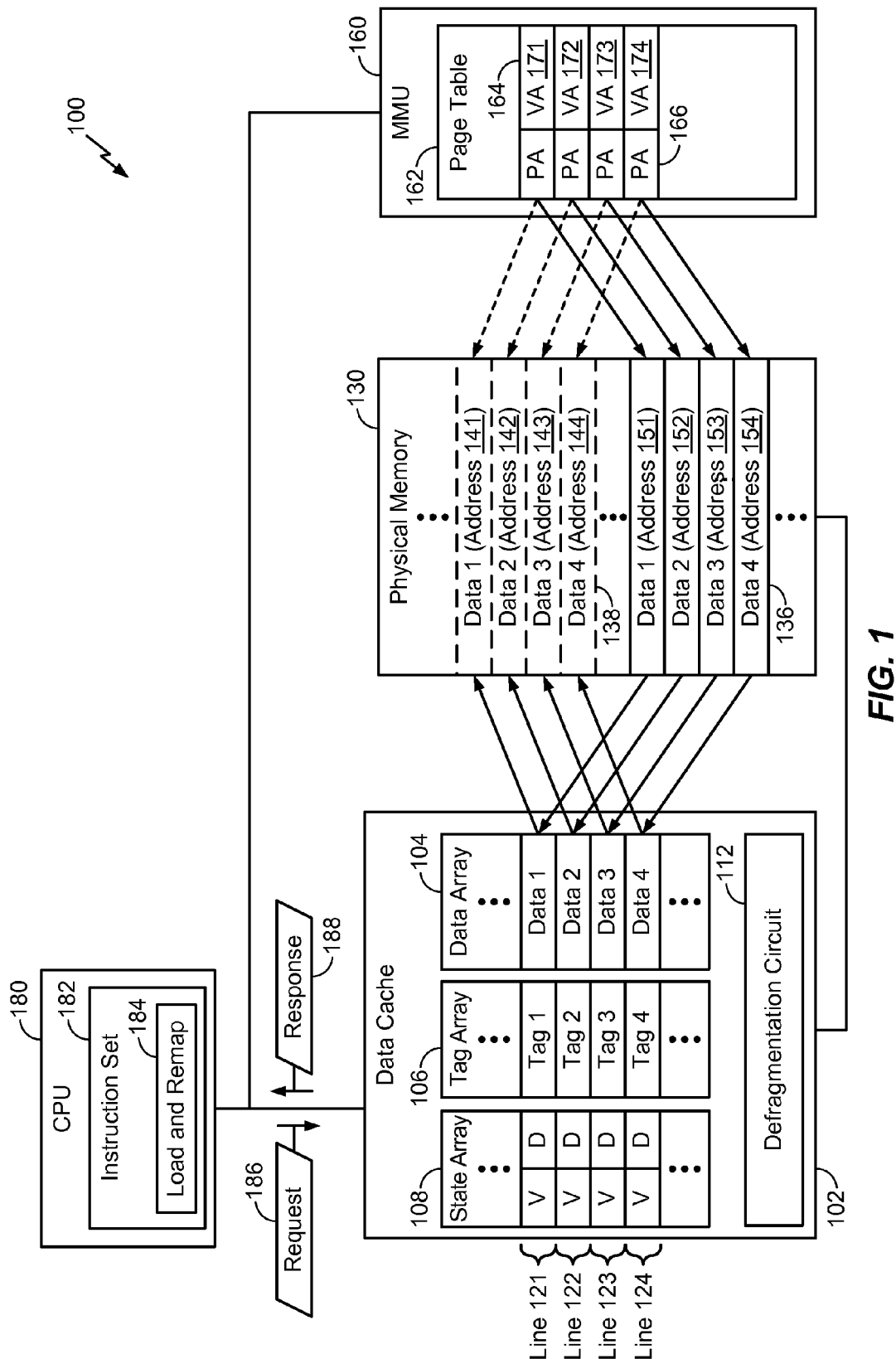
FIG. 1 is a block diagram of a particular illustrative embodiment of a system that is operable to perform a cache-based defragmentation process.

Referring to FIG. 1, a particular illustrative embodiment of a system that is operable to perform a cache based defragmentation process is depicted and generally designated 100. The system 100 includes a data cache 102, a physical memory 130, a memory management unit (MMU) 160, and a processor (e.g., a central processing unit (CPU) 180). The system 100 may enable defragmentation of the physical memory 130 without continuously using processing resources of the CPU 180 (e.g., without requiring the CPU 180 to issue read and write instructions to move data from one location in the physical memory 130 to another location in the physical memory 130).

The data cache 102 may include a data array 104, a tag array 106, and a state array 108. The data cache 102 may also include a defragmentation circuit 112 to perform defragmentation operations on the physical memory 130. The data array 104, the tag array 106, and the state array 108 may be organized in multiple cache lines (e.g., cache lines 121-124). Each cache line may include data from a particular row of the data array 104 and may have corresponding tag data in the tag array 106 and corresponding state information in state array 108. The state information may include validity information and/or dirty information. For example, each cache line may include a validity bit and/or a dirty bit. In alternate embodiments, the state array 108 may include additional, fewer, and/or different state bits. Although not shown in FIG. 1, the data cache 102 may be a multi-way (e.g., N-way) set associative cache, as described with reference to FIGS. 4-7.

The physical memory 130 may store data at a plurality of addresses. For example, the physical memory 130 may store first data at a first address 151, second data at a second address 152, third data at a third address 153, and fourth data at a fourth address 154. After a cache-based defragmentation process, as further described herein, the first data may be stored at a fifth address 141, the second data may be stored at a sixth address 142, the third data may be stored at a seventh address 143, and the fourth data may be stored at an eighth address 144. The physical memory 130 may be organized into pages. For example, the addresses 151-154 are illustrated as corresponding to a first page 136 and the addresses 141-144 are illustrated as corresponding to a second page 138. Defragmenting the physical memory 130 may include moving data from the first page 136 to the second page 138. For example, the first page 136 may correspond to a memory fragment that is surrounded by unallocated memory pages, and the second page 138 may correspond to a memory hole (e.g., an unallocated memory page).

The memory management unit (MMU) 160 may manage and organize the physical memory 130 as well as virtual memory. For example, the MMU 160 may map virtual memory addresses (VAs) to physical memory addresses (PAs) of the physical memory 130. To illustrate, the memory management unit 160 may include a page table 162. The page table 162 may include an array of VAs 164 and an array of pointers 166 that map the VAs 164 to the PAs of the physical memory 130. In the example of FIG. 1, a first virtual memory address 171 is mapped to the first physical address 151, a second virtual memory address 172 is mapped to the second physical address 152, a third virtual memory address 173 is mapped to the third physical address 153, and a fourth virtual memory address 174 is mapped to the fourth physical address 154. Although not shown, the page table 162 may include many more virtual address mappings to other addresses of the physical memory 130 and/or to other memory devices.

The memory management unit 160 may be accessible by the defragmentation circuit 112 of the data cache 102 to remap a particular virtual memory address from a particular physical memory address to another physical memory address. For example, the defragmentation circuit 112 may remap the first virtual memory address 171 to the fifth physical address 141, the second virtual memory address 172 to the sixth physical address 142, the third virtual memory address 173 to the seventh physical address 143, and the fourth virtual memory address 174 to the eighth physical address 144 during a cache based defragmentation operation performed by the defragmentation circuit 112, as further described herein. The virtual memory addresses 171-174 may be remapped during individual operations or as part of a single remapping operation.

The CPU 180 may be configured to execute instructions of an instruction set 182 to perform operations. The instruction set 182 includes a load and remap instruction 184. The load and remap instruction 184 may be issued by software (e.g., operating system software, application software, etc.) running at the CPU 180. The load and remap instruction 184 may cause the CPU 180 to initiate cache based defragmentation operations at the data cache 102.

In operation, the CPU 180 may receive the load and remap instruction 184. In response to the load and remap instruction 184, the CPU 180 may issue a request 186 to the data cache 102. The request 186 may cause the data cache 102 to perform one or more defragmentation operations. A defragmentation operation may include relocating a single data item from a page in the physical memory 130, multiple data items from the page, an entire page, or multiple pages. For example, the load and remap instruction 184 may specify that the first data stored at the first PA 151 is to be relocated to the fifth PA 141. The defragmentation circuit 112 may initiate copying of the first data from the first physical memory address 151 into the row of the data array 104 corresponding to the cache line 121. In an alternative embodiment, the first data may have previously been loaded into the data array 104 as part of cache operations unrelated to defragmentation (e.g., in response to a read request or a write request from the CPU 180 that precedes the request 186).

The defragmentation circuit 112 may initiate modification of lookup information associated with a virtual memory address corresponding to the first data that was copied into the data cache 102. For example, the virtual memory address 171 may initially be mapped to the physical memory address 151, as depicted in FIG. 1 by a solid arrow from the virtual memory address 171 to the physical memory address 151. After the data associated with the physical memory address 151 has been loaded into the cache line 121, the defragmentation circuit 112 may initiate modification of the page table 162 so that the pointer associated with the virtual memory address 171 points to the fifth physical memory address 141, as depicted by the dotted arrow between the virtual memory address 171 and the fifth physical memory address 141. In a particular embodiment, the defragmentation circuit 112 initiates modification of the page table 162 by issuing a command to the MMU 160. Alternately, the CPU 180 may cause the MMU 160 to modify the page table 162 (e.g., before or after issuing the request 186).

The defragmentation circuit 112 may modify tag information in the tag array 106 corresponding to the data cache line 121. The tag information may be used by the data cache 102 to determine a physical address of the physical memory 130 where data is to be written when the data stored in the cache line 121 is evicted from the data cache 102. To illustrate, the tag information corresponding to the cache line 121 may include at least a portion of the first physical address 151. The defragmentation circuit 112 may overwrite the tag information corresponding to the cache line 121 with at least a portion of the fifth physical address 141. When the data is evicted from the data cache 102, the data will be written to the fifth physical address 141 instead of the first physical address 151. The data may be evicted in accordance with a cache management policy, such as least recently used (LRU), least frequently used (LFU), first-in-first-out (FIFO), etc. The data may also be evicted on demand (e.g., in response to a request from the CPU 180, such as the request 186). In an alternative embodiment, the tag information may be modified before modifying the lookup information. In a particular embodiment, the defragmentation circuit 112 may also set the dirty bit of the cache line 121 to trigger writing of the data to the physical address 151, as further described herein.

The defragmentation circuit 112 may perform defragmentation operations on multiple memory fragments of the physical memory 130. The multiple defragmentation operations may be performed concurrently or one-at-a-time. In the example of FIG. 1, the defragmentation circuit 112 also copies second data from the second physical address 152 into the second cache line 122, third data from the third physical address 153 into the third cache line 123, and fourth data from the fourth physical address 154 into the fourth cache line 124. The defragmentation circuit 112 may modify tag information associated with each of the additional cache lines 122-124 so that the tag information corresponds to the PAs 142-144 instead of the PAs 152-154. After the tag information has been modified, the cache 102 may write the second data, the third data, and the fourth data to the PAs 142-144, respectively.

Thus, the data cache 102 may be used to perform defragmentation operations on the physical memory 130. After completing the cache based defragmentation operation(s) indicated by the request 186, the data cache 102 may send a response 188 to the CPU 180 indicating that the cache-based defragmentation operation has been completed. In a particular embodiment, the defragmentation operations may include interrupt based operations. For example, the response 188 may include an interrupt that causes the CPU 180 to perform operations corresponding to an interrupt handler. In a particular embodiment, the interrupt handler may be associated with an operating system running at the CPU 180.

In a particular embodiment, the defragmentation operations may also include marking a cache line as dirty to trigger the writing of data stored in the cache line to a different physical memory address. For example, the dirty bit corresponding to the cache line 121 may be asserted (e.g., set) to indicate that the first data stored at the cache line 121 has been modified (although only the tag information, and not the first data, has been modified). In the course of data cache operations, the data cache 102 may write each cache line marked as dirty to a physical address of the physical memory 130. For example, the first data stored at the cache line 121 may be written to the physical memory 130. Because the tag information corresponding to the cache line 121 has been modified to point to the fifth physical address 141, the data stored at the cache line 121 will be written to the fifth physical address 141 instead of the first physical address 151 of the physical memory 130. Hence, marking the cache line 121 as dirty may trigger the data cache to write the first data in the cache line 121 to the second physical memory address 141.

In a particular embodiment, the tag information may include only a portion of a source physical address or a destination physical address. In order to relocate data from a source physical address (e.g., an address associated with a data fragment) to a destination physical address (e.g., a defragmentation destination), the defragmentation circuit 112 may relocate data within the data cache 102 in addition to modifying the tag information. After relocating data within the data cache 102, a source cache line (the location of the data before the relocation) may be marked as invalid (e.g., by modifying the validity information of the state array 108), and a destination cache line (the location of the data after the relocation) may be marked as valid. Particular embodiments of relocating data within a cache are described with reference to FIGS. 4-7.

In a particular embodiment, the described cache-based defragmentation process can be used to defragment individual files or structures stored in the physical memory 130. For example, portions of the physical memory 130 occupied by a particular file associated with an application may be fragmented (e.g., non-contiguous). The described cache-based defragmentation process may relocate the fragments of the file so that the file occupies a single contiguous region of the physical memory 130.

Performing defragmentation operations at the data cache 102 instead of at the CPU 180 enables the CPU 180 to perform other operations while defragmentation is occurring or to remain in an idle/power-save mode, thereby conserving processor resources and power at the system 100.

Figure 2:
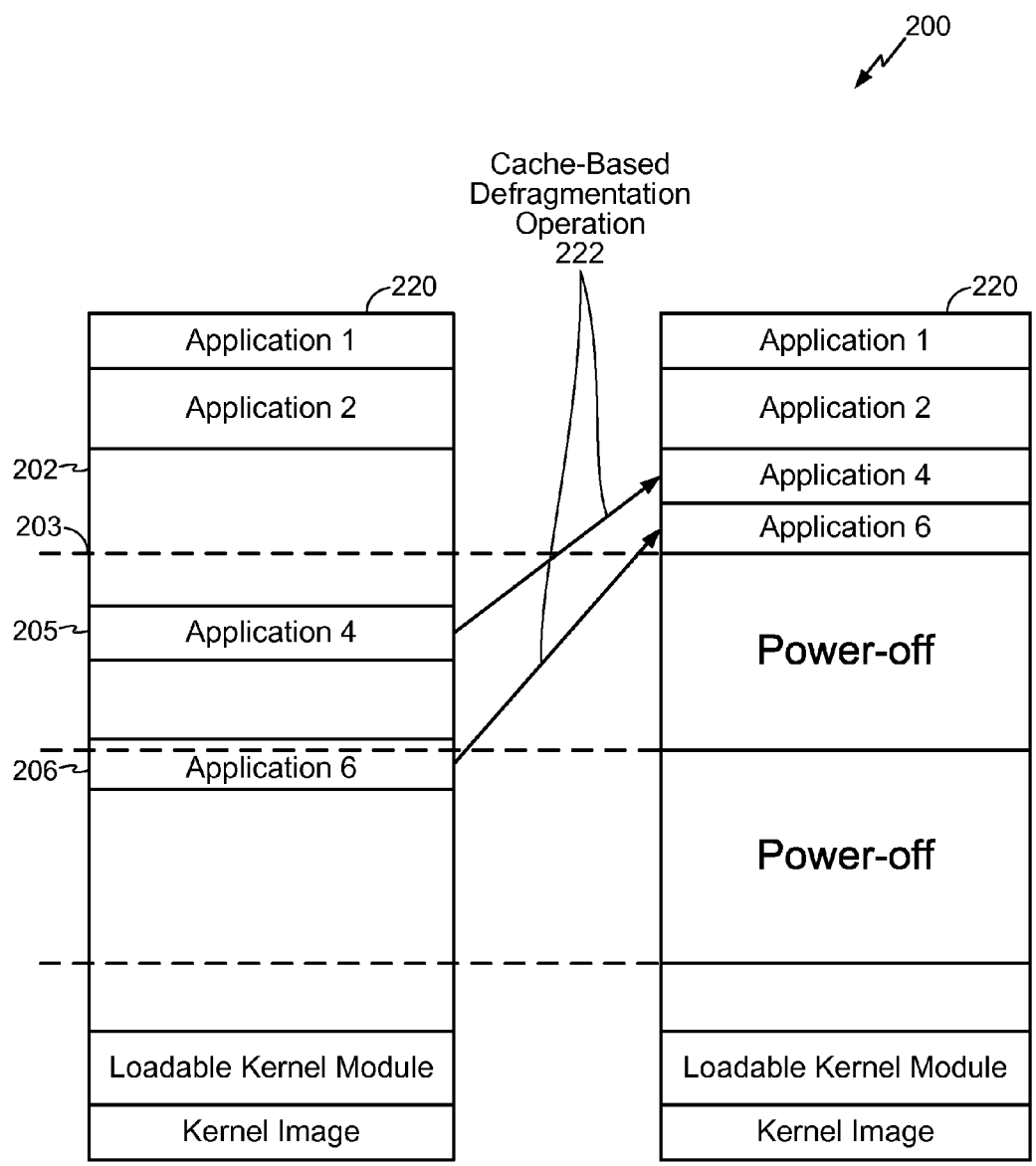
FIG. 2 is a diagram depicting a particular illustrative embodiment of a memory of FIG. 1 before and after a cache-based defragmentation process.

FIG. 2 depicts an embodiment of a memory that stores data (before and after performing a cache-based defragmentation process) and is generally designated 200. A memory 220 (e.g., corresponding to the 130 of FIG. 1) may initially include application data stored at any number of memory locations. For example, the memory 220 is illustrated as including application data for multiple applications (e.g., Application 1, Application 2, Application 4, and Application 6). The memory 220 may include application data corresponding to Application 4 stored at a first memory address 205 and application data corresponding to Application 6 stored at a second memory address 206.

The memory 220 may also include memory addresses that are not associated with application data. For example, the memory 220 may include a third memory address 202 and a fourth memory address 203 corresponding to free (e.g., unallocated) memory addresses that are not associated with applications. The free memory addresses may be associated with memory holes. As used herein, a "hole" is an unallocated (e.g., free) physical address or region of memory that may be surrounded by allocated physical addresses or regions of memory. For example, the third memory address 202 and the fourth memory address 203 are located between memory addresses that store data associated with Application 2 and Application 4. Memory holes may develop over the course of memory use due to the allocation and deallocation of memory. For example, data associated with another application (e.g., Application 3, Application 5) may have initially been stored at the memory holes. When the memory is deallocated (e.g., due to the application terminating) a hole may develop. The first memory address 205 and the second memory address 206 are considered memory "fragments" because the first memory address 205 and the second memory address 206 are each an allocated region of memory that is surrounded by unallocated regions of memory (e.g., holes).

Cache-based defragmentation operations 222 may be performed on the memory 220. For example, the memory 220 may be coupled to a data cache, such as the data cache 102 of FIG. 1. After the cache-based defragmentation operations 222 are performed, the memory 220 may include blocks of memory that are associated with unallocated memory. When the memory 220 is a dynamic random access memory (DRAM), partial array self-refresh (PASR) may be applied to the unallocated memory. For example, when an entire DRAM chip is unallocated, PASR may power down the DRAM chip. When a DRAM chip is powered down, the DRAM chip is not periodically refreshed using a refresh current, which may conserve power at an electronic device.

Further, by using cache-based defragmentation on the memory 220, processor resources may be preserved. For example, a processor may perform operations unrelated to defragmentation while a cache performs the defragmentation. Further, the cache-based defragmentation operations may be integrated into cache operations, thereby reducing power consumption as compared to defragmentation operations that use processor functions to copy data from memory fragments to memory holes.

Figure 3A:
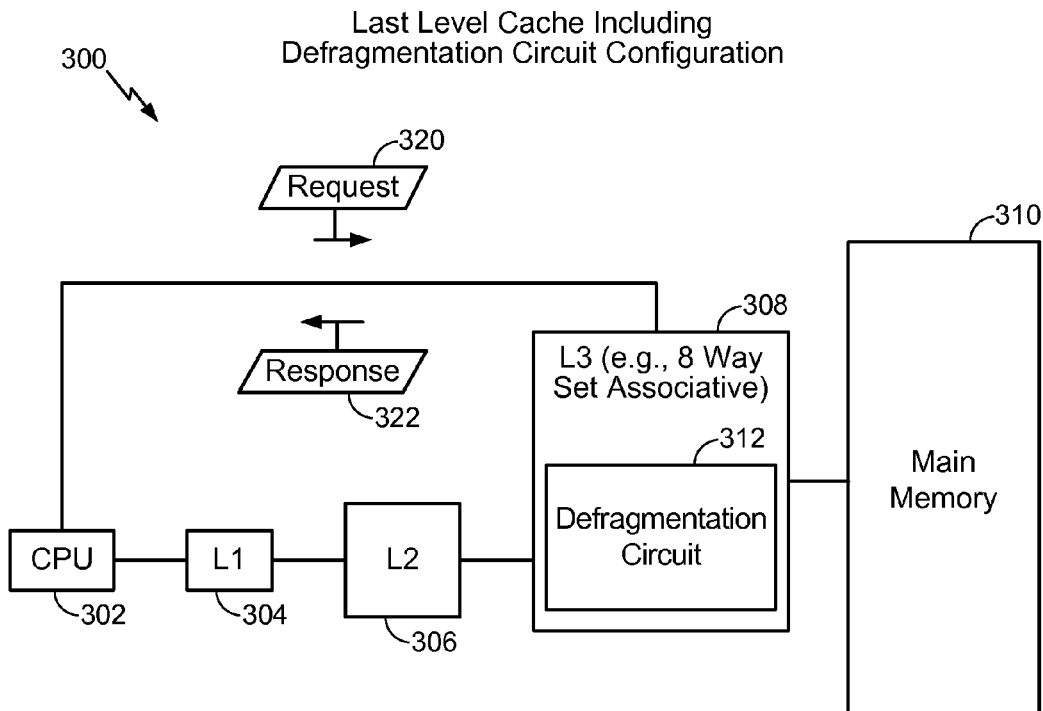
FIG. 3A is a block diagram of another particular illustrative embodiment of a system that is operable to perform a cache-based defragmentation process.

Referring to FIG. 3A, a particular embodiment of a system for performing a cache-based defragmentation operation is depicted and generally designated 300. The system 300 includes a processor 302 (e.g., a CPU), a first level (e.g., L1) cache 304, a second level (e.g., L2) cache 306, a third level (e.g., L3) cache 308, and a main memory 310. The third level cache 308 may be referred to as a last level cache (the cache nearest to the main memory 310 in the succession of cache levels). Although three levels of cache are depicted in the system 300 of FIG. 3A, the system 300 may include any number caches arranged in any order. As depicted in FIG. 3A, a defragmentation circuit 312 may be integrated into the last level cache to enable memory defragmentation to occur over the course of cache memory management, thereby reducing reliance on additional hardware resources to perform the memory defragmentation.

The third level cache 308 may correspond to the data cache 102 of FIG. 1. The CPU 302 may correspond to the CPU 180 of FIG. 1, and the main memory 310 may correspond to the main memory 160 of FIG. 1 or the memory 220 of FIG. 2. Hence, the system 300 may perform cache-based memory defragmentation operations as described with reference to FIG. 1. For example, the CPU 302 may send a request 320 to the third level cache 308 to perform a defragmentation operation on the main memory 310. In response to the request 320, the defragmentation circuit 312 may load data stored at a first physical memory address of the memory 310 into a cache line of the third level cache 308. The defragmentation circuit 312 may modify information (e.g., tag information and/or state information) associated with the cache line to indicate that the cache line corresponds to a second physical memory address of the main memory 310. The third level cache 308 may then write the data to the second physical memory address of the main memory 310 as part of the cache operations.

Figure 3B:
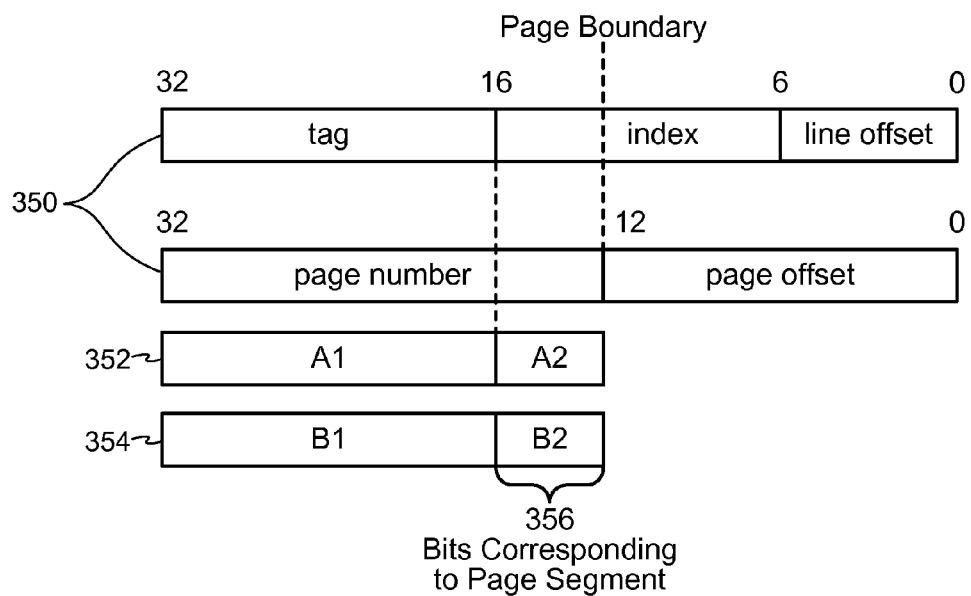
FIG. 3B is a diagram of a particular illustrative embodiment of a defragmentation addressing scheme corresponding to the system of FIG. 3A.

FIG. 3B illustrates an addressing scheme that may be used in particular embodiments described herein. In the illustrated addressing scheme, a physical address 350 may represent a location within physical memory (e.g., the main memory 310 of FIG. 3A). A source address 352 may correspond to a first page (e.g., a memory fragment) of the physical memory and a destination address 354 may correspond to a second page (e.g., a defragmentation destination or memory hole) of the physical memory. Moving data from the source address 352 to the destination address 354 may include moving the data to a different page of the physical memory (e.g., changing the page number) without changing a page offset of the data location.

The physical address 350 may be divided into a tag, an index, and a line offset, as shown. The value of the tag may be stored within the third-level cache 308 at a cache line (e.g., one of the cache lines 121-124 of FIG. 1) and may be used by the third-level cache 308 to associate corresponding data to the physical memory address 350. The third-level cache 308 may be a set associative cache, and the index may indicate a set within the third-level cache 308 at which the data is stored. The line offset may indicate a line within the set at which the data is stored. The physical address 350 may also be represented as a page number and a page offset, as shown. In FIG. 3B, the physical address 350 is a 32-bit physical address. A page of the main memory 310 may include a 4 kilobyte (KB) physical page (represented by a 12-bit page offset). The page number may be represented by the remaining 20 bits of the physical address.

In a particular embodiment, the third level cache 308 is an 8-way 512 KB last level cache. Each cache line of the third level cache 308 may include 64 bytes (represented by a 6-bit line offset). The third level cache 308 may include 1024 sets (represented by a 10-bit index). The remaining 16 bits of the physical address 350 may include the tag. In the embodiment of FIG. 3B, the tag includes fewer bits (16 bits) than the page number (20 bits). Thus, the page number may overlap the index of the third-level cache 308 (e.g., by 4 bits). The overlapping portion of the page number may affect which set the data is stored at within the third-level cache 302. Each page may be divided into segments depending on the overlapping portion of the index (e.g. the most significant bits of the index). In FIG. 3B, each page is divided into 16 page segments.

In order to move a memory fragment from a first page of the main memory 310 to a second page of the main memory 310, the defragmentation circuit 312 may change the tag of the physical address 350 as described with reference to FIG. 1. However, changing the tag of the physical address 350 may only change a portion of the page number of the physical address 350, because the page number may include more bits than the tag. In order to change the entire page number, the defragmentation circuit may also change a portion of the index. To change the portion of the index, the defragmentation circuit may move data from a first cache line corresponding to a first page segment to a second cache line corresponding to a second page segment. Determining whether to move data from the first page segment to the second page segment is described further with reference to FIGS. 4-7.

The source address 352 may be divided into tag information A1 and segment information A2. Similarly, the destination address 354 may be divided into tag information B1 and segment information B2. When the source address 352 and the destination address 354 are in different segments, data may be moved from one cache set (corresponding to a first segment of the page) to another cache set (corresponding to a second segment of the page).

FIGS. 4-7 illustrate particular embodiments of cache-based defragmentation operations within the context of the system 300 of FIG. 3A and FIG. 3B. The embodiments include a first embodiment (FIG. 4) where the source address and the destination address correspond to the same page segment and the data is already located within the cache (e.g., a cache hit), a second embodiment (FIG. 5) where the source address and the destination address correspond to the same page segment and the data is not located within the cache (e.g., a cache miss), a third embodiment (FIG. 6) where the source address and the destination address correspond to different page segments and the data is already located within the cache, and a fourth embodiment (FIG. 7) where the source address and the destination address correspond to different page segments and the data is not located with the cache.

Figure 4:
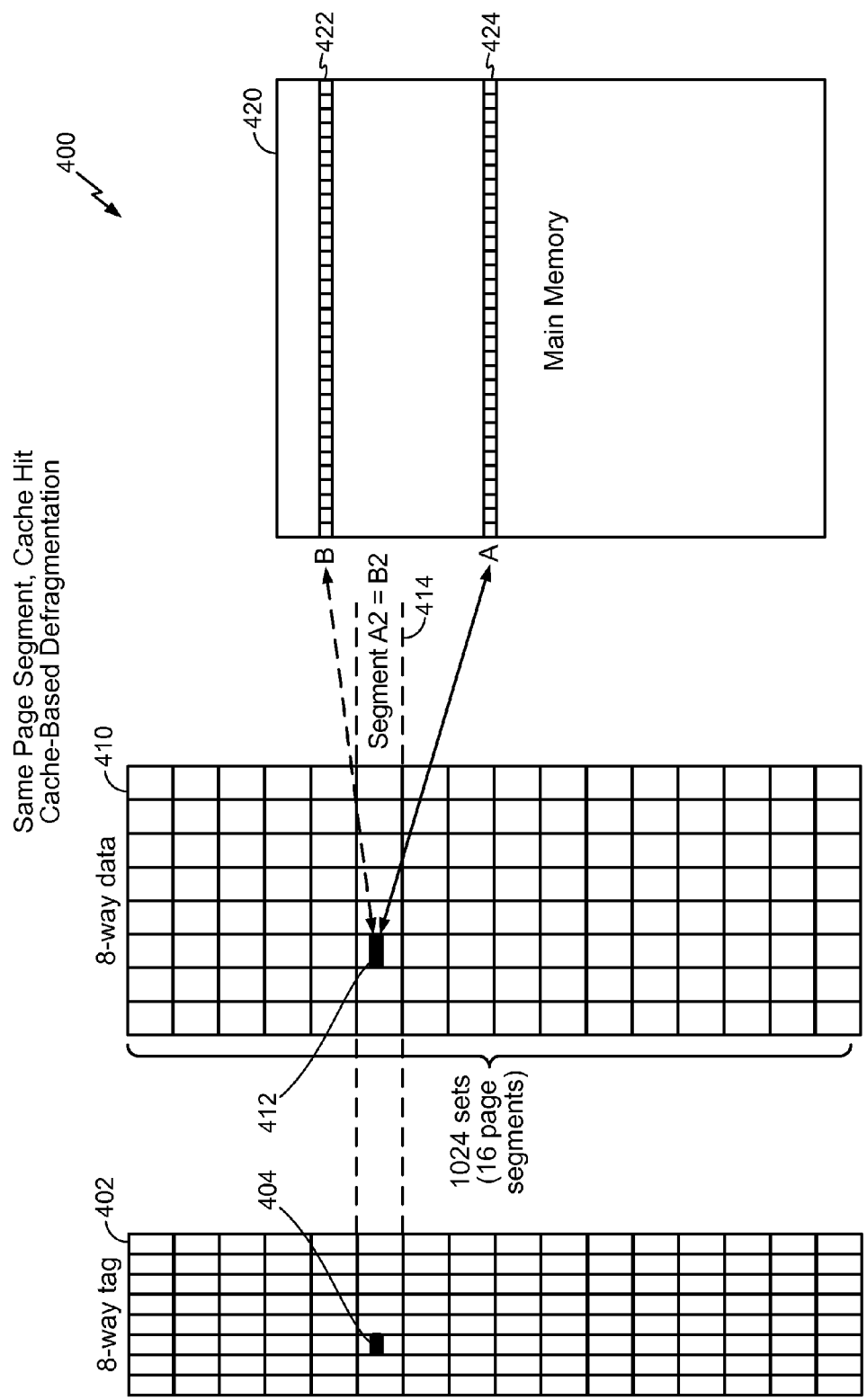
FIG. 4 is a block diagram illustrating a first embodiment of cache-based defragmentation operations performed by a defragmentation circuit of FIG. 3A.

Referring to FIG. 4, a first embodiment of cache-based defragmentation operations performed by a defragmentation circuit (e.g., the defragmentation circuit 312 of FIG. 3A) is depicted and generally designated 400. FIG. 4 illustrates a data cache (e.g., corresponding to the data cache 102 of FIG. 1 and/or the third level data cache 308 of FIG. 3A) including a tag array 402 (e.g., a tag array of an 8-way set associative cache), and a data array 410 (e.g., a data array of the 8-way set associative cache). FIG. 4 also illustrates a main memory 420 (e.g., corresponding to the physical memory 130 of FIG. 1 and/or the physical memory 310 of FIG. 3A) associated with a plurality of addresses. For example, the main memory 420 may be configured to store data at a source address 424 (e.g., corresponding to the source address 352 of FIG. 3B) and a destination address 422 (e.g., corresponding to the destination address 354 of FIG. 3B).

The tag array 402 may correspond to the tag array 106 of FIG. 1 and the data array 410 may correspond to the data array 104 of FIG. 1. For example, the tag array 402 may include tag information (e.g., tag information 404) corresponding to data stored within the cache (e.g., at a data location 412). The tag array 402 and the data array 410 may be divided into 16 page segments. The page segments may be further divided into sets (e.g., 1024 sets corresponding to a 10-bit index).

In the embodiment of FIG. 4, the source address 424 and the destination address 422 correspond to the same page segment 414 (e.g., A2 of the source address 352 of FIG. 3B equals B2 of the destination address 354 of FIG. 3B). Further, data corresponding to the source address 424 has been loaded (e.g., during cache operations) into a data location 412 of the data array 410 (as shown by a solid block at the data location 412). When a request to perform defragmentation operations is received, a cache hit may result, because the data stored at the source address 424 is already loaded into the cache.

A defragmentation circuit (e.g., the defragmentation circuit 312 of FIG. 3A) may modify the tag information 404 associated with the data. For example, the defragmentation circuit may replace the tag corresponding to the source address (e.g., A1 of the source address 352 of FIG. 3B) with the tag corresponding to the destination address (e.g., B1 of the destination address 354 of FIG. 3B). The defragmentation circuit may also mark the data as dirty (e.g., by modifying a dirty bit in the state array 108, as described with reference to FIG. 1) to trigger write back of the data to the main memory 420. When the data is evicted from the cache, the data is written to the destination address 422 instead of the source address 424.

Figure 5:
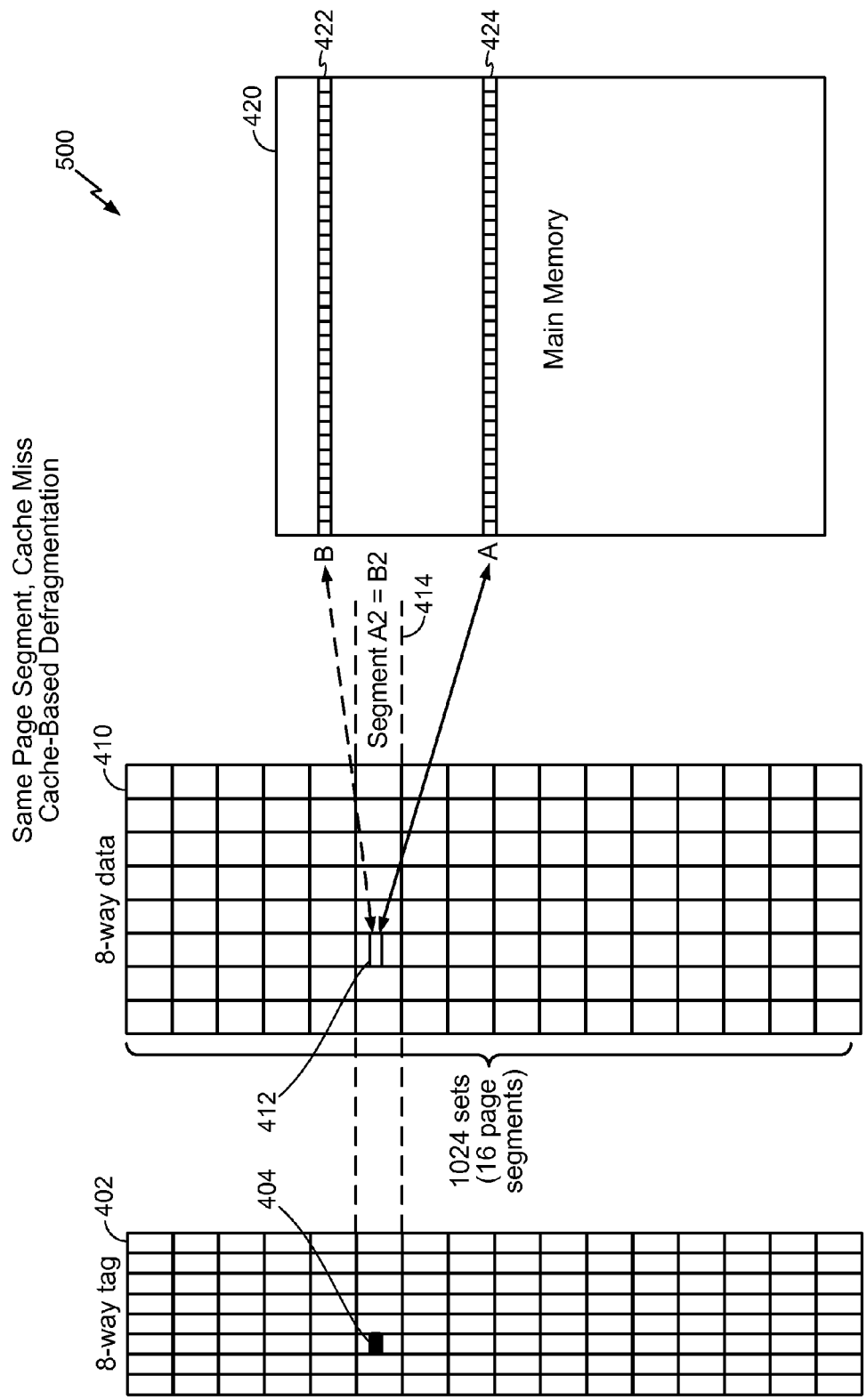
FIG. 5 is a block diagram illustrating a second embodiment of cache-based defragmentation operations performed by a defragmentation circuit of FIG. 3A.

Referring to FIG. 5, a second embodiment of cache-based defragmentation operations performed by a defragmentation circuit is depicted and generally designated 500. FIG. 5 corresponds to operations when the page segments are the same (A2=B2) but a cache miss occurs. Thus, when the cache-based defragmentation operations are initiated, data corresponding to the source address 424 has not yet been loaded into the cache location 412 of the data array 410 (as shown by a hollow block at the cache location 412). When a request to perform defragmentation operations is received, a cache miss may result.

The defragmentation circuit (as described with reference to FIG. 4) may load the data stored at the source address 424 into the cache location 412. However, instead of inserting the tag A1 associated with the source address 424 in the tag array 402, the defragmentation circuit may instead insert the tag B1 associated with the destination address 422 in the tag 404. The defragmentation circuit may also mark the data as dirty. When the data is evicted from the cache the data is written to the destination address 422 instead of the source address 424.

Figure 6:
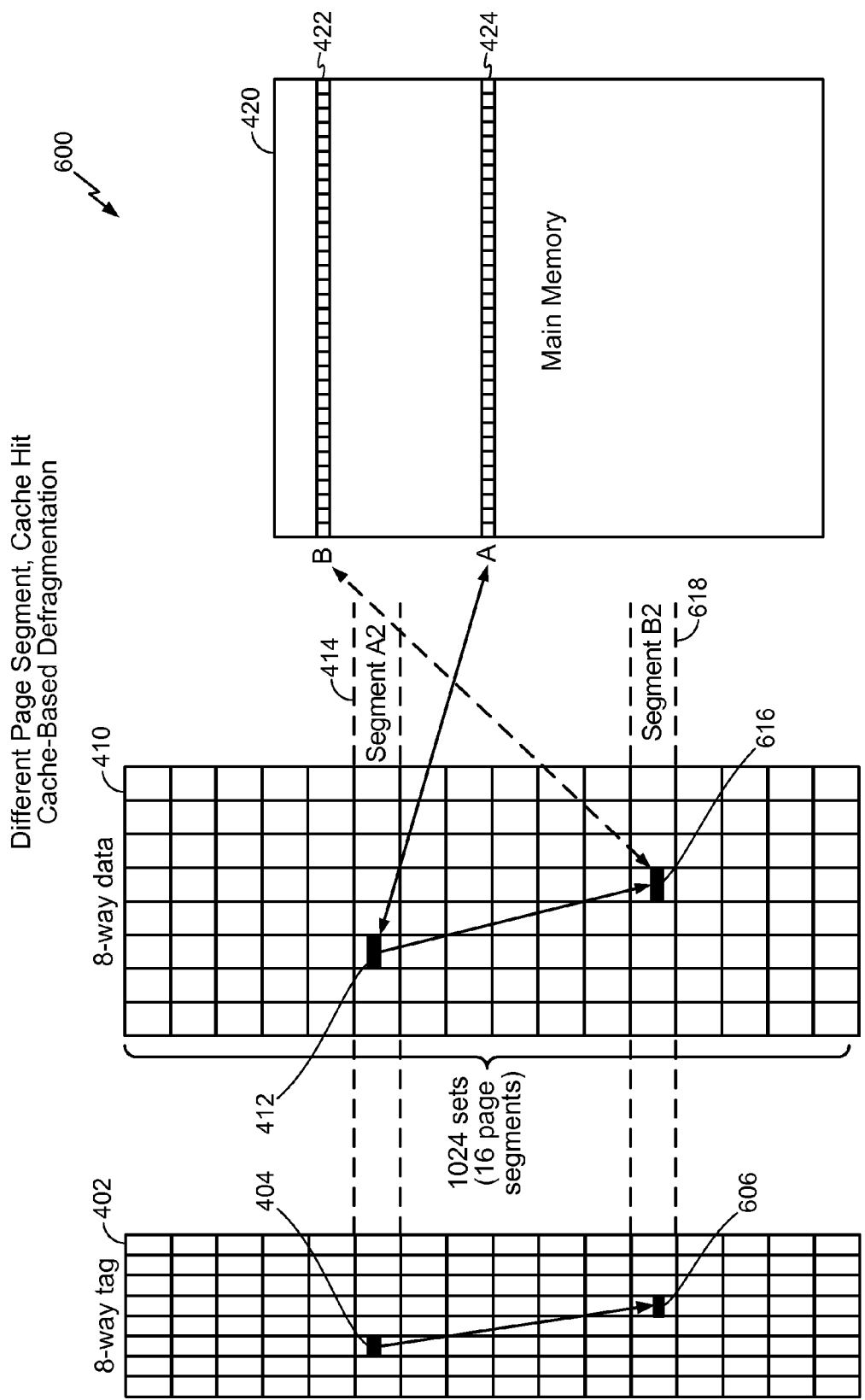
FIG. 6 is a block diagram illustrating a third embodiment of cache-based defragmentation operations performed by a defragmentation circuit of FIG. 3A.

Referring to FIG. 6, a third embodiment of cache-based defragmentation operations performed by a defragmentation circuit is depicted and generally designated 600. FIG. 6 corresponds to operations when the page segments are different (A2 does not equal B2) and a cache hit occurs. The source address 424 may correspond to a first page segment 418 and the destination address 422 may correspond to a second page segment 618. Data corresponding to the source address 424 has been loaded into the cache location 412 of the data array 410 (as shown by a solid block at the cache location 412). When a request to perform defragmentation operations is received, a cache hit results.

The defragmentation circuit (as described with reference to FIGS. 4 and 5) may move the data stored at the cache location 412 to a second cache location 616 associated with the second page segment 618. The defragmentation circuit may also insert, into the tag array 402, the tag B1 corresponding to the destination address 422 as the tag information 606 corresponding to the cache location 616. The defragmentation circuit may invalidate the data stored in cache location 412 (e.g., by changing a validity bit).

The defragmentation circuit may also mark the data as dirty to trigger write back of the data to the main memory 420. When the data is evicted from the cache (e.g., over the course of cache operations) the data is written to the destination address 422 instead of the source address 424.

Figure 7:
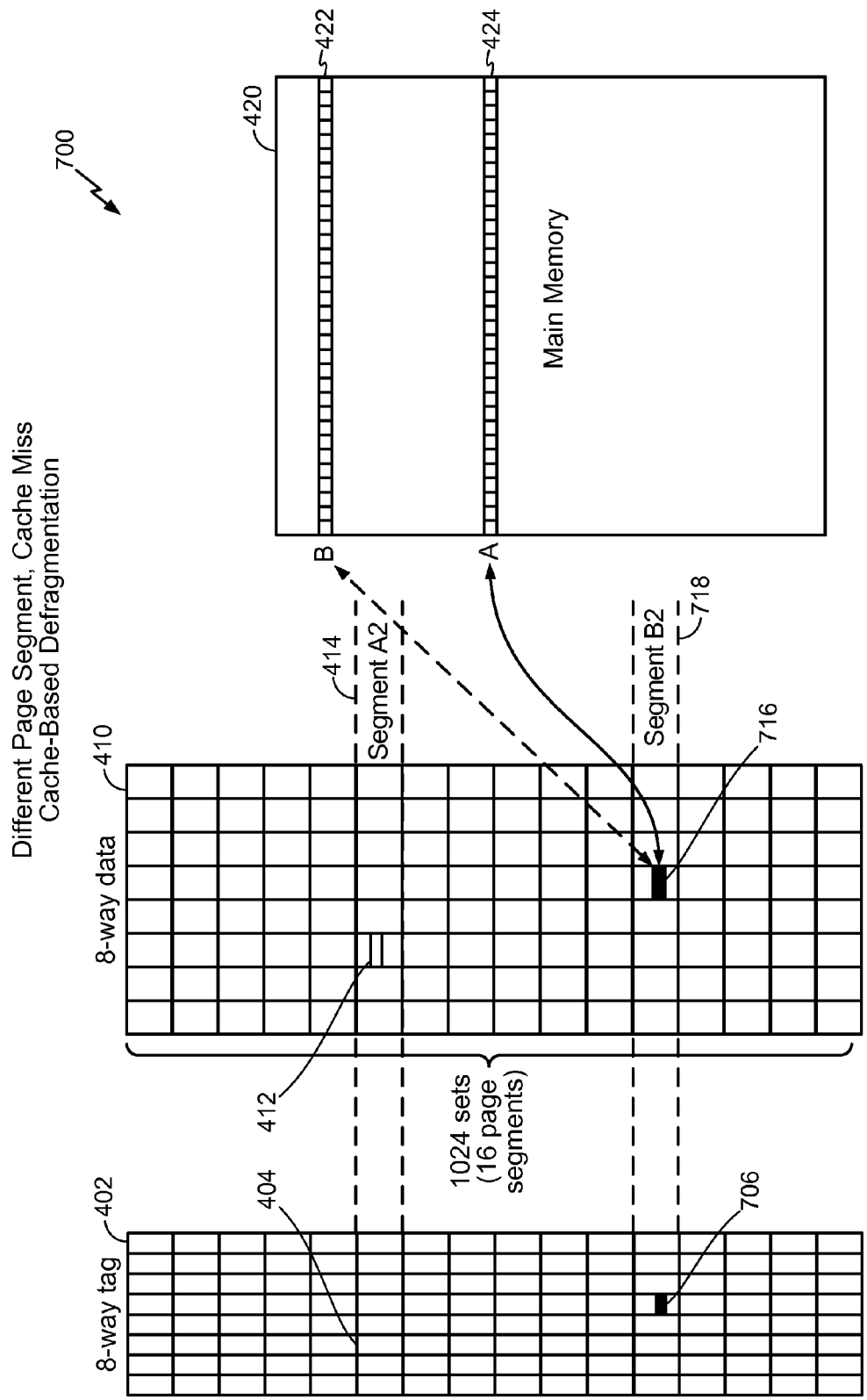
FIG. 7 is a block diagram illustrating a fourth embodiment of cache-based defragmentation operations performed by a defragmentation circuit of FIG. 3A.

Referring to FIG. 7, a fourth embodiment of cache-based defragmentation operations performed by a defragmentation circuit is depicted and generally designated 700. FIG. 7 corresponds to operations when the page segments differ (A2 does not equal B2) and a cache miss occurs.

The defragmentation circuit (as described with reference to FIGS. 4, 5, and 6) may load the data stored at the source address 424 into a second segment 718 instead of the first segment 414. Instead of inserting the tag A1 associated with the source address 424 into the tag array 402 (e.g., as the tag information 404), the defragmentation circuit may insert the tag B1 associated with the destination address 422 into the tag array 402 (e.g., as the tag information 706). The defragmentation circuit may also mark the data as dirty. When the data is evicted from the cache (e.g., over the course of cache operations) the data is written to the destination address 422 instead of the source address 424. FIGS. 4-7 thus illustrate various embodiments of performing a cache-based defragmentation operation based on whether a cache hit or cache miss occurs and based on whether a source address and a destination address correspond to the same page segment or to different page segments.

Figure 8A:
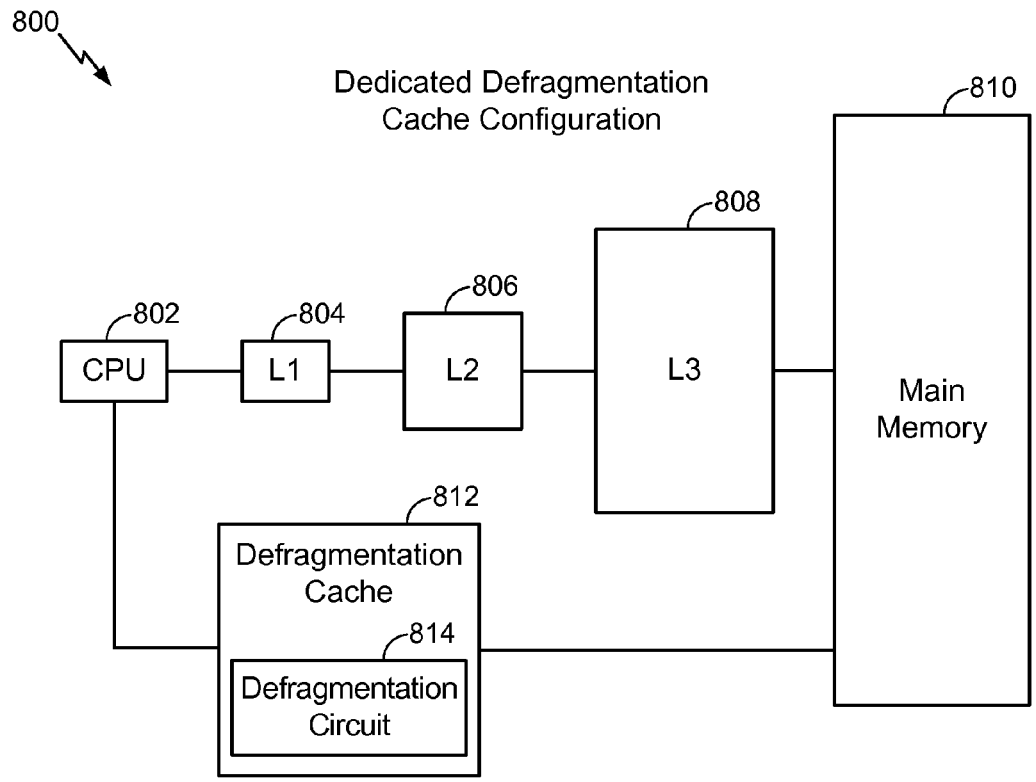
FIG. 8A is a block diagram of another particular illustrative embodiment of a system that is operable to perform a cache-based defragmentation process.

Referring to FIG. 8A, another particular embodiment of a system operable to perform a cache-based defragmentation process is depicted and generally designated 800. The system 800 includes a processor 802 (e.g., a CPU), a first level (e.g. L1) cache 804, a second level (e.g., L2) cache 806, a third level (e.g., L3) cache 808, and a main memory 810.

Although three levels of cache are depicted in the system 800 of FIG. 8A, the system 800 may include any number caches arranged in any order. In contrast to the system 300 of FIG. 3A, the system 800 includes a dedicated defragmentation cache 812 distinct from any of the other caches 804-808. The defragmentation cache 812 may also be distinct from (e.g. outside of) a cache path between the main memory 810 and the CPU 802. Being distinct from other caches within the system 800 may enable the defragmentation cache 812 to be smaller than the third level cache 808. Further, the defragmentation cache 812 may be used as an "assist" cache to the CPU 802 when the defragmentation cache 812 is not performing defragmentation operations. The defragmentation cache 812 may include a defragmentation circuit 814.

In operation, the CPU 802 may send a request to the defragmentation cache 812 to perform a defragmentation operation on the main memory 810. In response to the request, the defragmentation circuit 814 may load data stored at a first physical memory address of the memory 810 into a cache line of the defragmentation cache 808. The defragmentation circuit 814 may modify information associated with the cache line to indicate that the cache line corresponds to a second physical memory address of the main memory 810. The defragmentation cache 814 may write the data to the second physical memory address of the main memory (e.g., when the data is evicted).

Figure 8B:
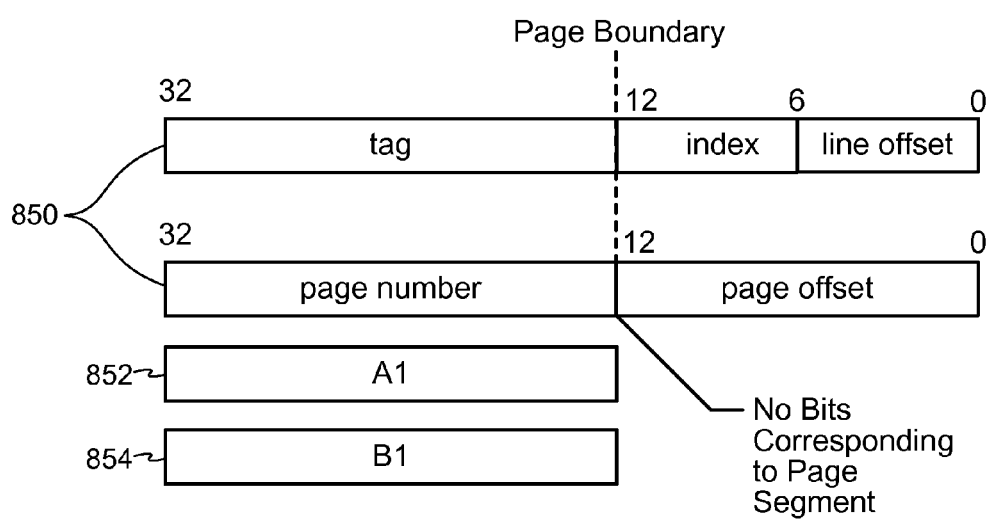
FIG. 8B is a diagram of a particular illustrative embodiment of a defragmentation addressing scheme corresponding to the system of FIG. 8A.

FIG. 8B is a diagram of an addressing scheme that may be used in conjunction with the system 800 of FIG. 8A. In the illustrated addressing scheme, a physical address 850 represents an address of data to be relocated. A source address 852 corresponds to a first page (e.g., a memory fragment) of the physical memory and a destination address 854 corresponds to a second page (e.g., a defragmentation destination or memory hole) of the physical memory. The physical address 850 may be divided into a tag, an index, and a line offset, as shown. The physical address 850 may also be represented as a page number and a page offset. In FIG. 8B, the physical address 850 is a 32-bit physical address. A page of the main memory 810 may include a 4 kilobyte (KB) physical page (represented by a 12-bit page offset). The defragmentation cache 812 may include an 8-way 32 KB cache. Each cache line of the defragmentation cache 812 may be 64 bytes (represented by a 6-bit line offset).

In the embodiment of FIG. 8A, the tag includes the same number of bits as the page number. Thus, the defragmentation cache 812 of FIG. 8A may change the entire page number of the physical address 850 by changing the tag of the physical address 850. The defragmentation circuit 814 may perform defragmentation operations without moving data from a first cache line to a second cache line within the defragmentation cache 812 based on page segment mismatches. As a result, the embodiment of FIG. 8A may be faster than the embodiment of FIG. 3A. However, the embodiment of FIG. 8A may occupy more chip area than the embodiment of FIG. 3A due to the introduction of the dedicated defragmentation cache 812.

Figure 9:
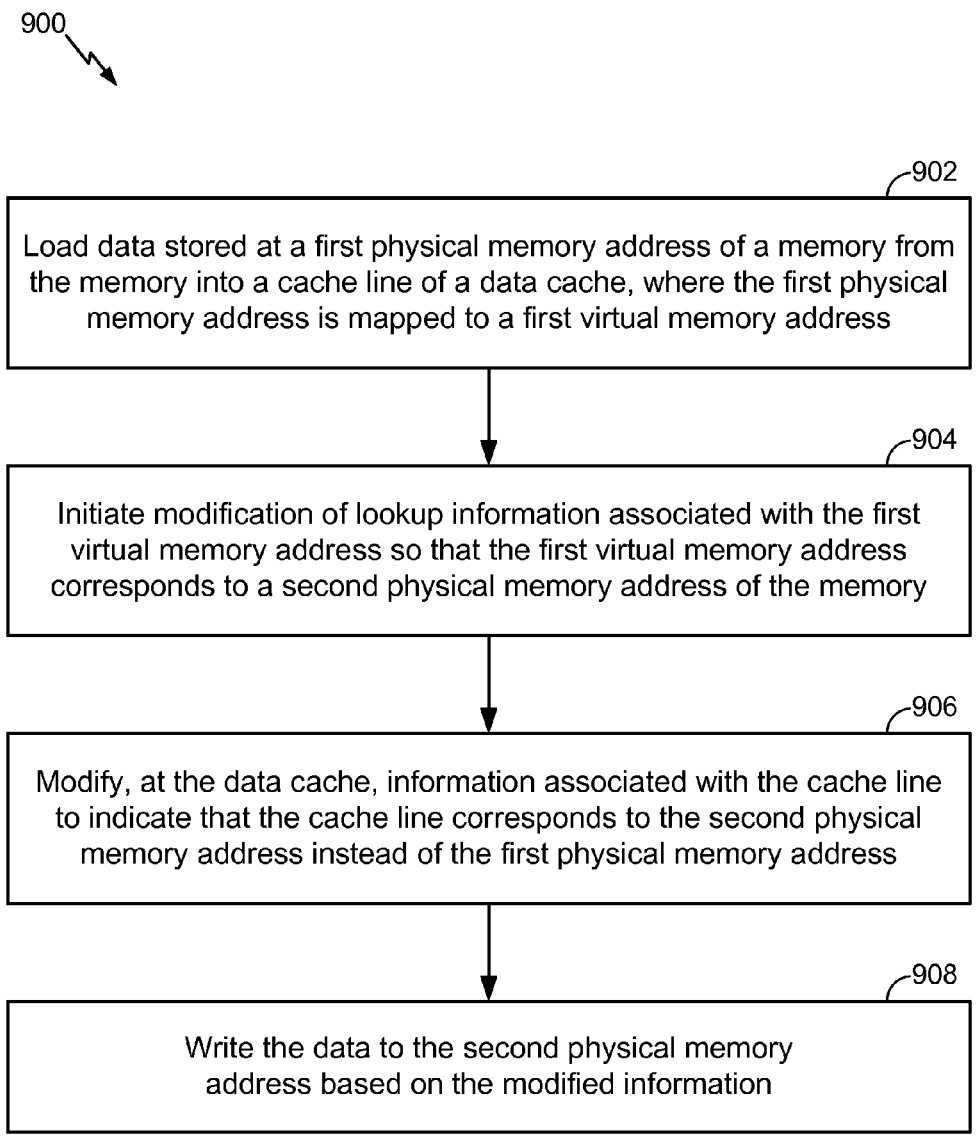
FIG. 9 is a flowchart of a particular illustrative embodiment of a method of performing cache-based defragmentation.

Referring to FIG. 9, a particular illustrative embodiment of a method 900 of performing cache-based defragmentation includes loading data stored at a first physical memory address of a memory from the memory into a cache line of a data cache, where the first physical memory address is mapped to a first virtual memory address, at 902. For example, the defragmentation circuit 112 of FIG. 1 may load first data corresponding to the first physical address 151 into the cache line 121. The first physical address 151 may be mapped to the first virtual address 171. The data cache may be a last level cache or a dedicated defragmentation cache.

The method 900 further includes initiating modification of lookup information associated with the first virtual memory address so that the first virtual memory address corresponds to a second physical memory address of the memory, at 904. For example, the page table 162 of FIG. 1 may be modified so that the virtual address 171 is mapped to the fifth physical address 141 instead of the first physical address 151.

The method 900 also includes modifying, at the data cache, information associated with the cache line to indicate that the cache line corresponds to the second physical memory address instead of the first physical memory address, at 906. For example, the first tag of the tag array 106 that corresponds to the cache line 121 of FIG. 1 may be modified to correspond to the fifth physical address 141 instead of the first physical address 151.

The method 900 includes writing the data to the second physical memory address based on the modified information, at 908. For example, the data cache 102 of FIG. 1 may write the data to the fifth physical memory address 141 based on the first tag information when the data is evicted from the data cache 102.

The method 900 may be repeated and/or executed concurrently for additional data stored at additional physical memory addresses. For example, additional data stored at each of a first plurality of additional physical memory addresses may be loaded into additional cache lines. Tag information of each of the additional cache lines may be modified to indicate that each additional cache line corresponds to a respective physical memory address of a second plurality of additional physical addresses. When evicted from the cache, the additional data may be written to the second plurality of additional physical addresses based on the modified tag information.

The method of FIG. 9 may be implemented by an application-specific integrated circuit (ASIC), a processing unit such as a central processing unit (CPU), a digital signal processor (DSP), a controller, a field-programmable gate array (FPGA) device, another hardware device, firmware device, or any combination thereof. As an example, the method of FIG. 9 can be performed by a processor that executes instructions, as described with respect to FIG. 11.

Figure 10:
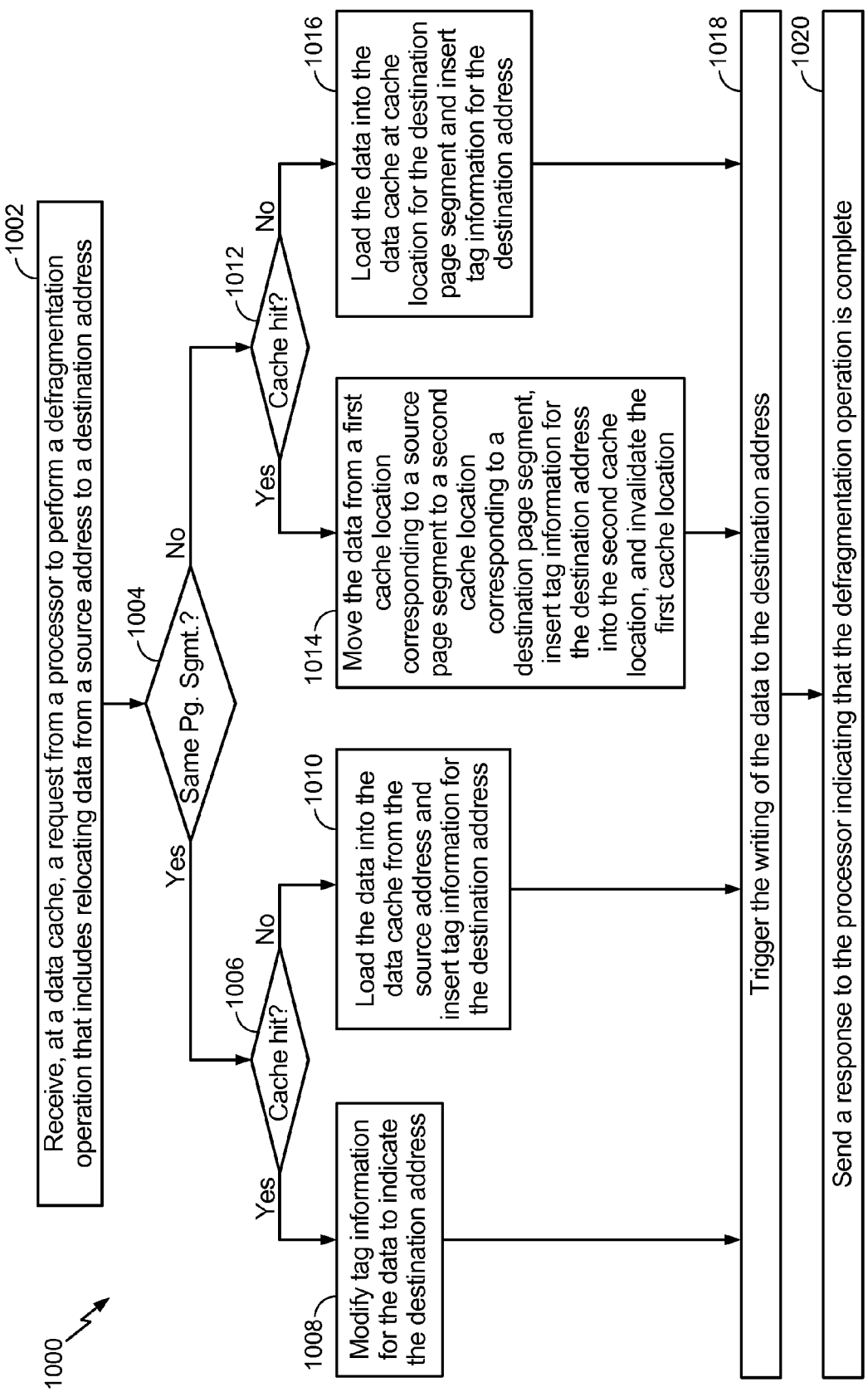
FIG. 10 is a flowchart of another particular illustrative embodiment of a method of performing cache-based defragmentation.

Referring to FIG. 10, a particular illustrative embodiment of a method 1000 of performing cache-based defragmentation is shown. In an illustrative embodiment, the method 1000 may correspond to operations described with reference to FIGS. 4-7. The method 1000 includes receiving, at a data cache, a request from a processor to perform a defragmentation operation, at 1002. The defragmentation operation includes relocating data from a source address to a destination address.

The method 1000 may further include determining whether the data is to be relocated from a page segment of a first page to the same page segment of a second page, at 1004. When the data is to be relocated from a page segment of a first page to the same page segment of a second page, the method 1000 may include determining whether the source address results in a cache hit, at 1006. For example, in FIG. 4, data corresponding to the source address 424 has been loaded into the data array 410, resulting in a cache hit. As another example, in FIG. 5, data corresponding to the source address 424 has not been loaded into the data array 410, resulting in a cache miss.

When a cache hit occurs, the method 1000 may include modifying tag information for the data to indicate the destination address instead of the source address, at 1008. For example, referring to FIG. 4, the tag information 404 may be modified to indicate the destination address 422 instead of the source address 424.

When a cache miss occurs, the method 1000 may include loading the data into the data cache from the source address and inserting tag information for the destination address instead of the source address, at 1010. For example, referring to FIG. 5, the data may be loaded from the source address 424 into the cache location 412, and the inserted tag information 404 may indicate the destination address 422 instead of the source address 424.

When the data is to be relocated from a page segment of a first page to a different page segment of a second page, the method 1000 may also include determining whether the source address results in a cache hit, at 1012 when the data is to be relocated to a different page segment. For example, in FIG. 6, data corresponding to the source address 424 has previously been loaded into the data array 410, resulting in a cache hit. As another example, in FIG. 7, data corresponding to the source address 424 has not previously been loaded into the data array 410, resulting in a cache miss.

When a cache hit occurs, the method 1000 may include moving the data from a first cache location corresponding to a source page segment to a second cache location corresponding to a destination page segment, at 1014. In addition, tag information for the destination address may be inserted into the second cache location and the first cache location may be invalidated. For example, referring to FIG. 6, the data may be moved from the cache location 412 to the cache location 616, tag information 606 for the destination address 422 may be inserted, and the cache location 412 may be marked as invalid. When a cache miss occurs, the method 1000 may include loading the data into the data cache at a cache location for the destination page segment and inserting tag information for the destination address, at 1016. For example, referring to FIG. 7, the data may be loaded from the source address 424 into the cache location 716 and the inserted tag information 706 may indicate the destination address 422.

The method 1000 may also include triggering the writing of the data to the destination address, at 1018. For example, the data may be marked dirty by asserting a dirty bit, as described with reference to FIGS. 4-7. The method 1000 may also include sending a response to the processor indicating that the defragmentation operation is complete, at 1020.

It should be noted that in alternate embodiments, the method of FIG. 10 may be modified. For example, when the addressing scheme of FIG. 8B is used instead of the addressing scheme of FIG. 3B, tag and page number information may both include the same number of bits and data may not have to be relocated within a data cache due to a page segment mismatch. In such an embodiment, performing a defragmentation operation may include checking for a cache miss but may not include checking for a page segment mismatch.

The method of FIG. 10 may be implemented by an application-specific integrated circuit (ASIC), a processing unit such as a central processing unit (CPU), a digital signal processor (DSP), a controller, a field-programmable gate array (FPGA) device, another hardware device, firmware device, or any combination thereof. As an example, the method of FIG. 10 can be performed by a processor that executes instructions, as described with respect to FIG. 11.

Figure 11:
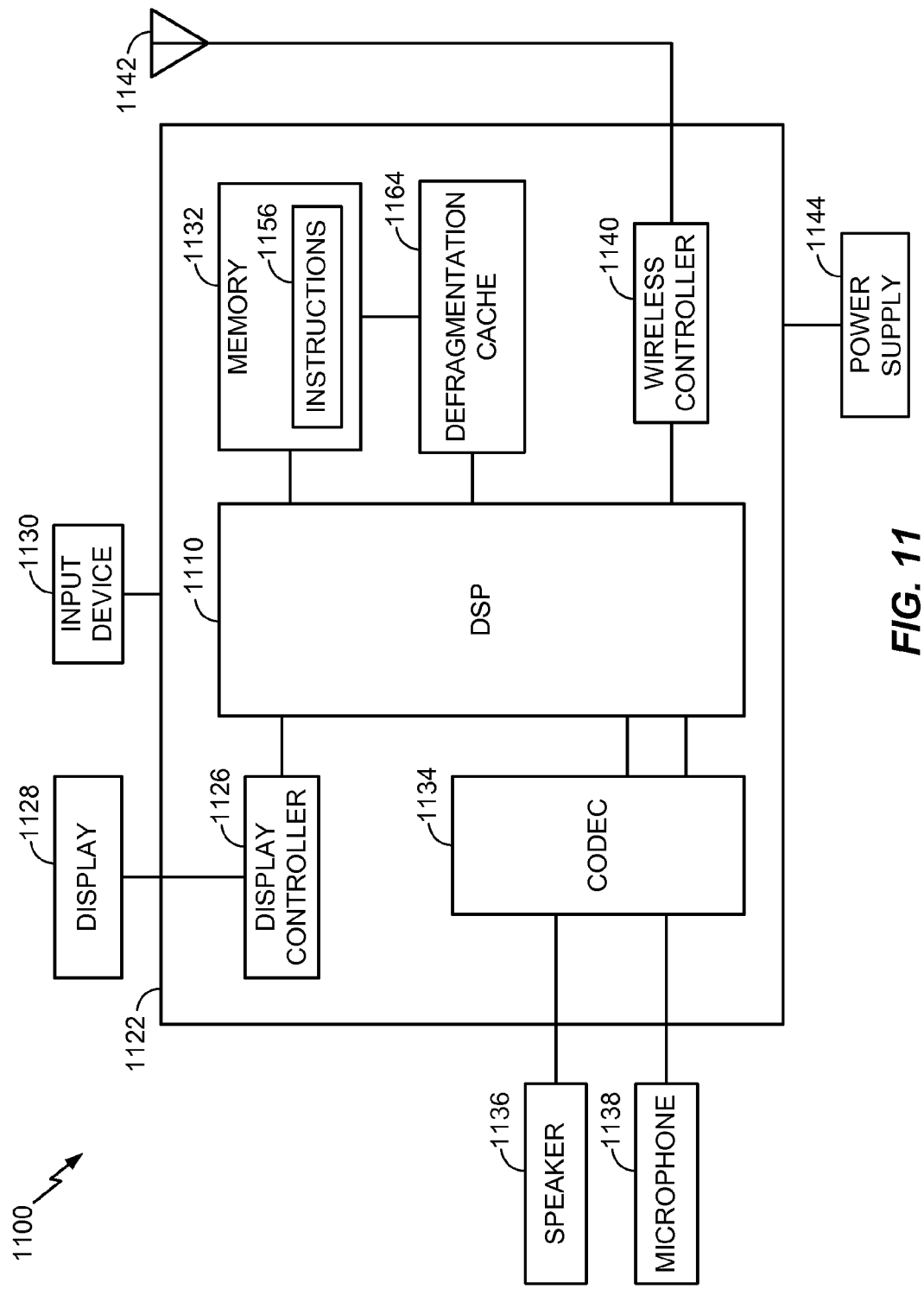
FIG. 11 is a block diagram of portable device including a data cache with a defragmentation circuit.

Referring to FIG. 11, a block diagram of a particular illustrative embodiment of a wireless communication device is depicted and generally designated 1100. The device 1100 includes a processor, such as a digital signal processor (DSP) 1110 (or a CPU or another type of processor), coupled to a memory 1132. The device 1100 may also include a defragmentation cache 1164 operable to perform defragmentation operations. In an illustrative embodiment, the defragmentation cache 1164 may correspond to the data cache 102 of FIG. 1, the third-level cache 308 of FIG. 3A, the defragmentation cache 812 of FIG. 8A, may operate according to the methods of FIG. 9, FIG. 10, FIG. 11, or any combination thereof.

The defragmentation cache 1164 may be coupled to the memory 1132 to perform defragmentation operations on the memory 1132. The memory 1132 may be a non-transitory computer readable medium storing data and computer-executable instructions 1156 (e.g., including the load and remap instruction 184 of FIG. 1) that are executable by the processor 1110 to perform operations. The operations may include loading data stored at a first physical memory address of the memory 1132 from the memory 1132 into a cache line of a defragmentation cache 1164. The first physical memory address may be mapped to a first virtual memory address. The operations may further include initiating modification of lookup information (e.g., the page table 162 of FIG. 1) associated with the first virtual memory address so that the first virtual memory address corresponds to a second physical memory address of the memory 1132. The operations may also include modifying information (e.g., the tag array 106 of FIG. 1) associated with the cache line to indicate that the cache line corresponds to the second physical memory address instead of the first physical memory address. The operations may include writing the data to the second physical memory address based on the modified information (e.g., when the data is evicted from the data cache).

FIG. 11 also shows a display controller 1126 that is coupled to the digital signal processor 1110 and to a display 1128. A coder/decoder (CODEC) 1134 can also be coupled to the digital signal processor 1110. A speaker 1136 and a microphone 1138 can be coupled to the CODEC 1134.

FIG. 11 also indicates that a wireless controller 1140 can be coupled to the digital signal processor 1110 and to an antenna 1142. In a particular embodiment, the DSP 1110, the display controller 1126, the memory 1132, the CODEC 1134, and the wireless controller 1140 are included in a system-in-package or system-on-chip device 1122. In a particular embodiment, an input device 1130 and a power supply 1144 are coupled to the system-on-chip device 1122. Moreover, in a particular embodiment, as illustrated in FIG. 11, the display 1128, the input device 1130, the speaker 1136, the microphone 1138, the antenna 1142, and the power supply 1144 are external to the system-on-chip device 1122. However, each of the display 1128, the input device 1130, the speaker 1136, the microphone 1138, the antenna 1142, and the power supply 1144 can be coupled to a component of the system-on-chip device 1122, such as an interface or a controller.

In conjunction with the described embodiments, a system is disclosed that may include means for storing data using a plurality of physical memory addresses, such as the physical memory 130 of FIG. 1, the main memory 310 of FIG. 3A, the main memory 810 of FIG. 8A, one or more other devices or circuits configured to store data using a plurality of physical memory addresses, or any combination thereof. The system may also include means for caching data, wherein the means for caching data includes a defragmentation circuit configured to load data stored at a first physical memory address of a memory from the memory into a cache line of a data cache, where the first physical memory address is mapped to a first virtual memory address. The defragmentation circuit may also be configured to initiate modification of lookup information associated with the first virtual memory address so that the first virtual memory address corresponds to a second physical memory address of the memory. The defragmentation circuit may further be configured to modify information associated with the cache line to indicate that the cache line corresponds to the second physical memory address instead of the first physical memory address. For example, the defragmentation circuit may include the defragmentation circuit 112 of FIG. 1, the defragmentation circuit 312 of FIG. 3, the defragmentation circuit 814 of FIG. 8, the defragmentation cache 1164 of FIG. 11, or any combination thereof.

Figure 12:
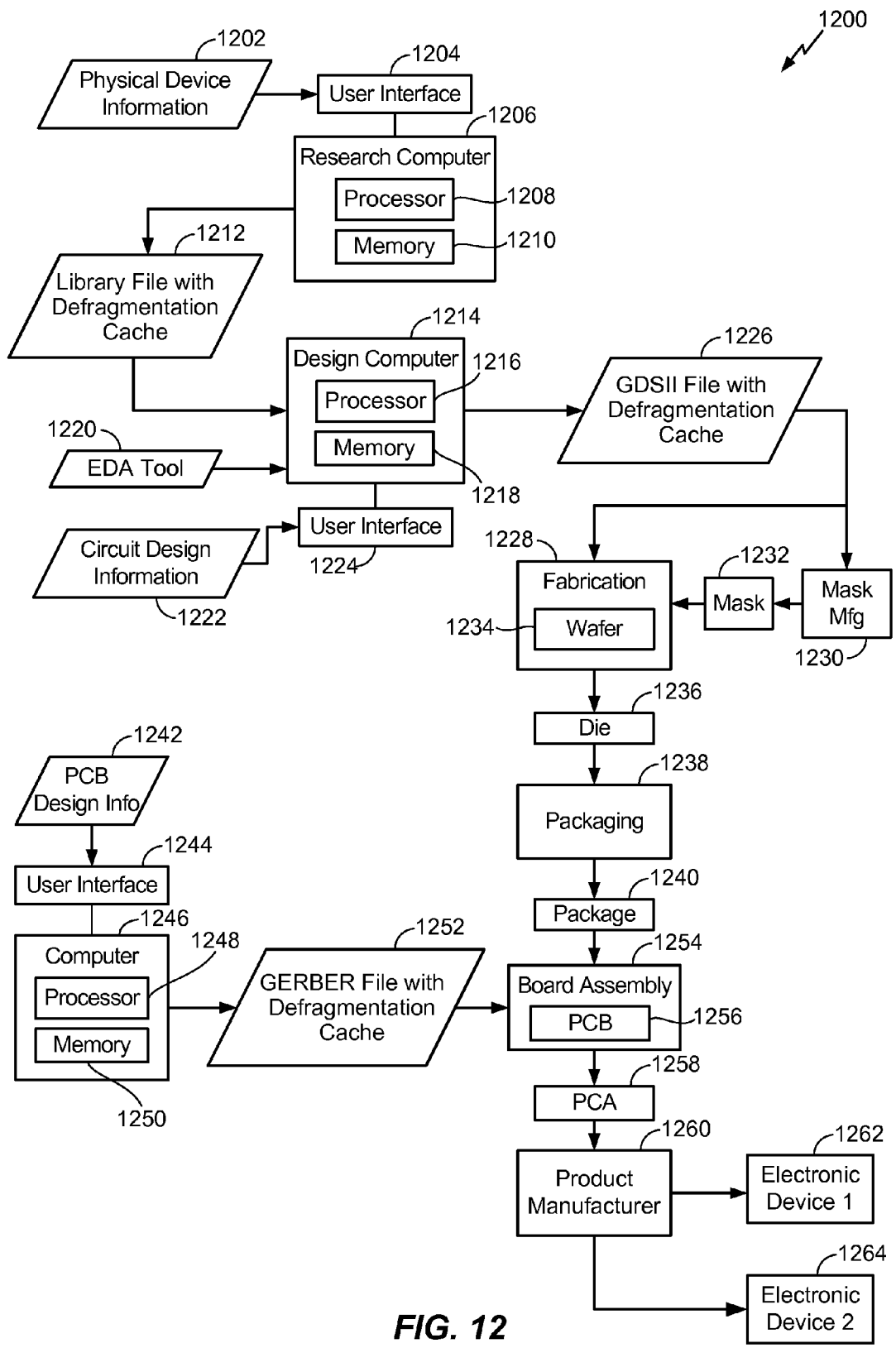
FIG. 12 is a data flow diagram of a particular illustrative embodiment of a manufacturing process to manufacture electronic devices that include a data cache with a defragmentation circuit.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 12 depicts a particular illustrative embodiment of an electronic device manufacturing process 1200.

Physical device information 1202 is received at the manufacturing process 1200, such as at a research computer 1206. The physical device information 1202 may include design information representing at least one physical property of a semiconductor device, such as the data cache 102 of FIG. 1, the third level cache 308 of FIG. 3A, the defragmentation cache 812 of FIG. 8A, the defragmentation cache 1164 of FIG. 11, or any combination thereof. For example, the physical device information 1202 may include physical parameters, material characteristics, and structure information that is entered via a user interface 1204 coupled to the research computer 1206. The research computer 1206 includes a processor 1208, such as one or more processing cores, coupled to a computer readable medium such as a memory 1210. The memory 1210 may store computer readable instructions that are executable to cause the processor 1208 to transform the physical device information 1202 to comply with a file format and to generate a library file 1212.

In a particular embodiment, the library file 1212 includes at least one data file including the transformed design information. For example, the library file 1212 may include a library of semiconductor devices including a device that includes the data cache 102 of FIG. 1, the third level cache 308 of FIG. 3A, the defragmentation cache 812 of FIG. 8A, the defragmentation cache 1164 of FIG. 11, or any combination thereof, that is provided for use with an electronic design automation (EDA) tool 1220.

The library file 1212 may be used in conjunction with the EDA tool 1220 at a design computer 1214 including a processor 1216, such as one or more processing cores, coupled to a memory 1218. The EDA tool 1220 may be stored as processor executable instructions at the memory 1218 to enable a user of the design computer 1214 to design a circuit including the data cache 102 of FIG. 1, the third level cache 308 of FIG. 3A, the defragmentation cache 812 of FIG. 8A, the defragmentation cache 1164 of FIG. 11, or any combination thereof, of the library file 1212. For example, a user of the design computer 1214 may enter circuit design information 1222 via a user interface 1224 coupled to the design computer 1214. The circuit design information 1222 may include design information representing at least one physical property of a semiconductor device, such as the data cache 102 of FIG. 1, the third level cache 308 of FIG. 3A, the defragmentation cache 812 of FIG. 8A, the defragmentation cache 1164 of FIG. 11, or any combination thereof. To illustrate, the circuit design property may include identification of particular circuits and relationships to other elements in a circuit design, positioning information, feature size information, interconnection information, or other information representing a physical property of a semiconductor device.

The design computer 1214 may be configured to transform the design information, including the circuit design information 1222, to comply with a file format. To illustrate, the file formation may include a database binary file format representing planar geometric shapes, text labels, and other information about a circuit layout in a hierarchical format, such as a Graphic Data System (GDSII) file format. The design computer 1214 may be configured to generate a data file including the transformed design information, such as a GDSII file 1226 that includes information describing the data cache 102 of FIG. 1, the third level cache 308 of FIG. 3A, the defragmentation cache 812 of FIG. 8A, the defragmentation cache 1164 of FIG. 11, or any combination thereof, in addition to other circuits or information. To illustrate, the data file may include information corresponding to a system-on-chip (SOC) that includes the data cache 102 of FIG. 1, the third level cache 308 of FIG. 3A, the defragmentation cache 812 of FIG. 8A, the defragmentation cache 1164 of FIG. 11, or any combination thereof, and that also includes additional electronic circuits and components within the SOC.

The GDSII file 1226 may be received at a fabrication process 1228 to manufacture the data cache 102 of FIG. 1, the third level cache 308 of FIG. 3A, the defragmentation cache 812 of FIG. 8A, the defragmentation cache 1164 of FIG. 11, or any combination thereof, according to transformed information in the GDSII file 1226. For example, a device manufacture process may include providing the GDSII file 1226 to a mask manufacturer 1230 to create one or more masks, such as masks to be used with photolithography processing, illustrated as a representative mask 1232. The mask 1232 may be used during the fabrication process to generate one or more wafers 1234, which may be tested and separated into dies, such as a representative die 1236. The die 1236 includes a circuit including a device that includes the data cache 102 of FIG. 1, the third level cache 308 of FIG. 3A, the defragmentation cache 812 of FIG. 8A, the defragmentation cache 1164 of FIG. 11, or any combination thereof.

The die 1236 may be provided to a packaging process 1238 where the die 1236 is incorporated into a representative package 1240. For example, the package 1240 may include the single die 1236 or multiple dies, such as a system-in-package (SiP) arrangement. The package 1240 may be configured to conform to one or more standards or specifications, such as Joint Electron Device Engineering Council (JEDEC) standards.

Information regarding the package 1240 may be distributed to various product designers, such as via a component library stored at a computer 1246. The computer 1246 may include a processor 1248, such as one or more processing cores, coupled to a memory 1250. A printed circuit board (PCB) tool may be stored as processor executable instructions at the memory 1250 to process PCB design information 1242 received from a user of the computer 1246 via a user interface 1244. The PCB design information 1242 may include physical positioning information of a packaged semiconductor device on a circuit board, the packaged semiconductor device corresponding to the package 1240 including the data cache 102 of FIG. 1, the third level cache 308 of FIG. 3A, the defragmentation cache 812 of FIG. 8A, the defragmentation cache 1164 of FIG. 11, or any combination thereof.

The computer 1246 may be configured to transform the PCB design information 1242 to generate a data file, such as a GERBER file 1252 with data that includes physical positioning information of a packaged semiconductor device on a circuit board, as well as layout of electrical connections such as traces and vias, where the packaged semiconductor device corresponds to the package 1240 including the data cache 102 of FIG. 1, the third level cache 308 of FIG. 3A, the defragmentation cache 812 of FIG. 8A, the defragmentation cache 1164 of FIG. 11, or any combination thereof. In other embodiments, the data file generated by the transformed PCB design information may have a format other than a GERBER format.

The GERBER file 1252 may be received at a board assembly process 1254 and used to create PCBs, such as a representative PCB 1256, manufactured in accordance with the design information stored within the GERBER file 1252. For example, the GERBER file 1252 may be uploaded to one or more machines to perform various steps of a PCB production process. The PCB 1256 may be populated with electronic components including the package 1240 to form a representative printed circuit assembly (PCA) 1258.

The PCA 1258 may be received at a product manufacture process 1260 and integrated into one or more electronic devices, such as a first representative electronic device 1262 and a second representative electronic device 1264. As an illustrative, non-limiting example, the first representative electronic device 1262, the second representative electronic device 1264, or both, may be selected from the group of a set top box, a music player, a video player, an entertainment unit, a navigation device, a communications device, a personal digital assistant (PDA), a fixed location data unit, and a computer, into which the data cache 102 of FIG. 1, the third level cache 308 of FIG. 3A, the defragmentation cache 812 of FIG. 8A, the defragmentation cache 1164 of FIG. 11, or any combination thereof is integrated. As another illustrative, non-limiting example, one or more of the electronic devices 1262 and 1264 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 12 illustrates remote units according to teachings of the disclosure, the disclosure is not limited to these illustrated units. Embodiments of the disclosure may be suitably employed in any device which includes active integrated circuitry including memory and on-chip circuitry.

A device that includes the data cache 102 of FIG. 1, the third level cache 308 of FIG. 3A, the defragmentation cache 812 of FIG. 8A, the defragmentation cache 1164 of FIG. 11, or any combination thereof, may be fabricated, processed, and incorporated into an electronic device, as described in the illustrative process 1200. One or more aspects of the embodiments disclosed with respect to FIGS. 1-11 may be included at various processing stages, such as within the library file 1212, the GDSII file 1226, and the GERBER file 1252, as well as stored at the memory 1210 of the research computer 1206, the memory 1218 of the design computer 1214, the memory 1250 of the computer 1246, the memory of one or more other computers or processors (not shown) used at the various stages, such as at the board assembly process 1254, and also incorporated into one or more other physical embodiments such as the mask 1232, the die 1236, the package 1240, the PCA 1258, other products such as prototype circuits or devices (not shown), the defragmentation cache 1164 of FIG. 11, or any combination thereof. Although various representative stages of production from a physical device design to a final product are depicted, in other embodiments fewer stages may be used or additional stages may be included. Similarly, the process 1200 may be performed by a single entity or by one or more entities performing various stages of the process 1200.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    loading data stored at a first physical memory address of a memory from the memory into a cache line of a data cache, wherein the first physical memory address is mapped to a first virtual memory address;
    initiating modification, of lookup information stored in a page table, the page table associated with a virtual memory, the lookup information associated with the first virtual memory address, wherein the modification of the lookup information remaps the first virtual memory address from the first physical memory address to a second physical memory address of the memory; and
    modifying, at the data cache, information associated with the cache line to indicate that the cache line corresponds to the second physical memory address instead of the first physical memory address.

2. The method of claim 1, further comprising:
    receiving, at the data cache, a request from a processor to perform a defragmentation operation;
    in response to the data being evicted from the data cache, writing the data to the second physical memory address based on the modified information; and
    sending a response to the processor after writing the data to the second physical memory address, the response indicating that the defragmentation operation is complete.

3. The method of claim 2, wherein the request is received in response to a load and remap instruction, and wherein an instruction set of the processor includes the load and remap instruction.

4. The method of claim 1, wherein the memory is organized into pages, wherein a page of the memory spans multiple sets of the cache, and wherein the cache includes multiple segments for each page, the method further comprising:
    loading, responsive to a cache hit associated with the first physical memory address, the data from a first segment of the cache corresponding to the first physical address to a second segment of the cache corresponding to the second physical address; and
    loading, based on a cache miss associated with the first physical memory address, the data from the memory into the second segment corresponding to the second physical address.

5. The method of claim 1, wherein modifying the information associated with the cache line comprises modifying tag information in a tag array associated with the cache line.

6. The method of claim 1, wherein modifying the information associated with the cache line comprises overwriting first tag information in a tag array corresponding to the first physical memory address with second tag information corresponding to the second physical memory address.

7. The method of claim 1, further comprising triggering writing of the data to the second physical memory address.

8. The method of claim 7, wherein triggering the writing of the data to the second physical memory address comprises marking the cache line as dirty.

9. The method of claim 1, wherein the first physical memory address corresponds to a memory fragment, and wherein the second physical memory address corresponds to a defragmentation destination.

10. The method of claim 9, wherein the defragmenting destination corresponds to a free physical address in the memory that is located between physical addresses that store data.

11. The method of claim 1, further comprising:
    copying the data from the cache line to a second cache line; and
    invalidating the cache line, wherein the cache line is associated with a first segment of the memory, and wherein the second cache line is associated with a second segment of the memory.

12. The method of claim 1, further comprising entering a partial array self-refresh mode that includes reducing power to a portion of dynamic random access memory (DRAM) that corresponds to the first physical memory address.

13. The method of claim 1, further comprising modifying the lookup information included in the page table, wherein the lookup information comprises a pointer of the page table.

14. The method of claim 1, further comprising:
loading second data stored at a third physical memory address of the memory from the memory into a second cache line of the data cache, wherein the third physical memory address is mapped to a third virtual memory address;
modifying, at the data cache, second information associated with the second cache line to indicate that the second cache line corresponds to a fourth physical memory address instead of the third physical memory address; and
writing the second data to the fourth physical memory address based on the modified second information.

15. The method of claim 1, further comprising:
loading additional data stored at each of a first plurality of additional physical memory addresses corresponding to a page of the memory into additional cache lines of the data cache;
modifying, at the data cache, additional information associated with each of the additional cache lines to indicate that each additional cache line corresponds to a respective physical memory address of a second plurality of additional physical memory addresses instead of the first plurality of additional physical memory addresses; and
writing the additional data to the second plurality of additional physical memory addresses based on the modified additional information.

16. The method of claim 1, wherein modifying the information associated with the cache is initiated by a processor integrated into an electronic device.

17. A system comprising:
a memory comprising a plurality of physical memory addresses;
a memory management unit (MMU) configured to store a page table associated with a virtual memory, the page table including lookup information associated with a first virtual memory address; and
a data cache that includes a defragmentation circuit configured to perform a memory defragmentation operation comprising:
loading data stored at a first physical memory address of the memory from the memory into a cache line of the data cache, wherein the first physical memory address is mapped to the first virtual memory address;
initiating modification of the lookup information, wherein the modification of the lookup information remaps the first virtual memory address from the first physical memory address to a second physical memory address of the memory; and
modifying information associated with the cache line to indicate that the cache line corresponds to the second physical memory address instead of the first physical memory address.

18. The system of claim 17, further comprising a processor, wherein the data cache is further configured to receive a request from the processor to perform the memory defragmentation operation and to send a response to the processor indicating that the memory defragmentation operation is complete.

19. The system of claim 18, wherein the response includes an interrupt signal, and wherein the cache performs the defragmentation operation while the processor performs operations unrelated to the defragmentation operation.

20. The system of claim 18, wherein the defragmentation circuit is configured to perform the memory defragmentation operation in response to the request.

21. The system of claim 18, wherein the defragmentation circuit is configured to perform the memory defragmentation operation in response to a data request received from the processor.

22. The system of claim 17, further comprising at least one additional cache, wherein the data cache is a last level cache coupled between a main memory and a second level cache, wherein initiating the modification includes issuing a command to the MMU, and wherein the MMU is configured to perform the modification responsive to the command.

23. The system of claim 17, wherein the data cache comprises a dedicated defragmentation cache coupled to a main memory and to a processor.

24. The system of claim 17, wherein the first physical memory address corresponds to a memory fragment, and wherein the second physical memory address corresponds to a defragmentation destination.

25. The system of claim 17, further comprising an electronic device selected from a mobile phone, a tablet, a computer, a communications device, a set-top box, a music player, a video player, an entertainment unit, a navigation device, a personal digital assistant (PDA), and a fixed location data unit into which the memory and the data cache are integrated.

26. A non-transitory computer-readable medium comprising instructions that, when executed by a processor, cause the processor to perform operations comprising:
loading data stored at a first physical memory address of a memory from the memory into a cache line of a data cache, wherein the first physical memory address is mapped to a first virtual memory address;
initiating modification of lookup information stored in a page table, the page table associated with a virtual memory, the lookup information associated with the first virtual memory address, wherein the modification of the lookup information remaps the first virtual memory address from the first physical memory address to a second physical memory address of the memory; and
modifying information associated with the cache line to indicate that the cache line corresponds to the second physical memory address instead of the first physical memory address.

27. The non-transitory computer-readable medium of claim 26, wherein the first physical memory address corresponds to a memory fragment, and wherein the second physical memory address corresponds to a defragmentation destination.

28. A system comprising:
means for storing data using a plurality of physical memory addresses; and
means for caching data, wherein the means for caching the data includes a defragmentation circuit configured to:
load data stored at a first physical memory address of a memory from the memory into a cache line of a data cache, wherein the first physical memory address is mapped to a first virtual memory address;

initiate modification of lookup information stored in a page table, the page table associated with a virtual memory, the lookup information associated with the first virtual memory address, wherein the modification of the lookup information remaps the first virtual memory address from the first physical memory address to a second physical memory address of the memory; and modify information associated with the cache line to indicate that the cache line corresponds to the second physical memory address instead of the first physical memory address.

29. The system of claim 28, integrated into at least one die.

30. The system of claim 29, wherein the first physical memory address corresponds to a memory fragment, and wherein the second physical memory address corresponds to a defragmentation destination.

* * * * *